US009094784B2

(12) United States Patent
Edge et al.

(10) Patent No.: US 9,094,784 B2
(45) Date of Patent: Jul. 28, 2015

(54) REGISTRATION OF A TERMINAL WITH A LOCATION SERVER FOR USER PLANE LOCATION

(75) Inventors: Stephen W. Edge, Escondido, CA (US); Andreas K. Wachter, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1214 days.

(21) Appl. No.: 11/869,698

(22) Filed: Oct. 9, 2007

(65) Prior Publication Data

US 2008/0133762 A1    Jun. 5, 2008

Related U.S. Application Data

(60) Provisional application No. 60/828,902, filed on Oct. 10, 2006, provisional application No. 60/864,448, filed on Nov. 6, 2006.

(51) Int. Cl.
*H04W 60/02* (2009.01)
*H04W 60/04* (2009.01)
*H04W 4/02* (2009.01)
(Continued)

(52) U.S. Cl.
CPC ............. *H04W 4/02* (2013.01); *H04L 63/0869* (2013.01); *H04L 63/166* (2013.01); *H04W 76/02* (2013.01)

(58) Field of Classification Search
USPC ........................................................ 709/228
See application file for complete search history.

(56) References Cited

U.S. PATENT DOCUMENTS

| 7,460,521 B2 * | 12/2008 | Son ................................ 370/352 |
| 2002/0069278 A1 * | 6/2002 | Forslow ......................... 709/225 |
| 2002/0090945 A1 * | 7/2002 | Sasada ........................... 455/435 |

(Continued)

FOREIGN PATENT DOCUMENTS

| EP | 1204290 A2 | 5/2002 |
| JP | 2005514868 A | 5/2005 |

(Continued)

OTHER PUBLICATIONS

Open Mobile Alliance: Secure user Plane Location Architecture; Draft Version 2.0; OMA-AD-SUPL-V2_0-20060823-D [Online] Aug. 23, 2006, pp. 1-54, XP002474044, Retrieved from the Internet: URL:http://member.openmobilealliance.org/ftp/public_documents/loc/Perma.

(Continued)

*Primary Examiner* — Natisha Cox
(74) *Attorney, Agent, or Firm* — Arnold J. Gum

(57) ABSTRACT

Techniques for supporting network-initiated location services for a terminal are described. A location server may not be able to reach the terminal in a normal manner in certain operating scenarios. The terminal may perform registration with the location server if the terminal determines that it may not be reachable by the location server in the normal manner. For the registration, the terminal may identify itself to the location server, instigate mutual authentication of the terminal and the location server, and provide an Internet Protocol (IP) address of the terminal to the location server. The terminal may perform registration with the location server whenever the IP address changes and/or periodically whenever a timer expires. The terminal may set the timer to a value received from the location server. The location server may use the IP address to send messages to the terminal for network-initiated location services.

39 Claims, 8 Drawing Sheets

(51) Int. Cl.
*H04L 29/06* (2006.01)
*H04W 76/02* (2009.01)

(56) References Cited

U.S. PATENT DOCUMENTS

| | | | |
|---|---|---|---|
| 2002/0133595 A1 | 9/2002 | Kimura et al. | |
| 2003/0045291 A1* | 3/2003 | Watanabe | 455/435 |
| 2003/0152068 A1* | 8/2003 | Balasaygun et al. | 370/356 |
| 2003/0153342 A1* | 8/2003 | Crockett et al. | 455/519 |
| 2003/0154249 A1* | 8/2003 | Crockett et al. | 709/204 |
| 2004/0122976 A1* | 6/2004 | Dutta et al. | 709/245 |
| 2004/0242238 A1* | 12/2004 | Wang et al. | 455/456.1 |
| 2005/0085239 A1* | 4/2005 | Cedervall | 455/456.1 |
| 2005/0181805 A1* | 8/2005 | Gallagher | 455/456.1 |
| 2005/0232189 A1* | 10/2005 | Loushine | 370/328 |
| 2006/0034211 A1* | 2/2006 | Kojima | 370/328 |
| 2006/0058042 A1* | 3/2006 | Shim | 455/456.3 |
| 2006/0077932 A1* | 4/2006 | Takeda et al. | 370/331 |
| 2006/0258369 A1* | 11/2006 | Burroughs et al. | 455/456.1 |
| 2007/0060133 A1* | 3/2007 | Spitzer et al. | 455/445 |
| 2007/0086382 A1* | 4/2007 | Narayanan et al. | 370/331 |
| 2007/0096981 A1* | 5/2007 | Abraham | 342/357.15 |
| 2008/0133762 A1* | 6/2008 | Edge et al. | 709/228 |
| 2009/0098821 A1* | 4/2009 | Shinya | 455/3.01 |
| 2010/0020942 A1* | 1/2010 | Olshansky et al. | 379/45 |

FOREIGN PATENT DOCUMENTS

| | | |
|---|---|---|
| JP | 2005526425 | 9/2005 |
| JP | 2006211406 A | 8/2006 |
| JP | 2006521767 | 3/2011 |
| KR | 20050104420 | 11/2005 |
| RU | 2005130765 | 5/2006 |
| WO | 0217667 | 2/2002 |
| WO | WO03058922 A1 | 7/2003 |
| WO | WO03069943 A1 | 8/2003 |
| WO | 03086002 | 10/2003 |
| WO | WO2004080096 | 9/2004 |
| WO | WO2006031022 A1 | 3/2006 |

OTHER PUBLICATIONS

International Search Report—PCT/US2007/080982, International Search Authority—European Patent Office—Apr. 10, 2008.
Written Opinion—PCT/US2007/080982, International Search Authority—European Patent Office—Apr. 10, 2008.
OMA-AD-SUPL0-V1 "Secure User Plane Location Architecture" Jun. 15, 2007.
OMA-TS-ULP-V1 "User Plane Location Protocol" Jun. 15, 2007.
IETF RFC 2246 "The TLS Protocol" Jan. 1999.
IETF RFC 4279 "Pre-Shared Key Ciphersuites for Transport Layer Security (TLS)" Dec. 2005.
3GPP2 S.S0109-0 "Generic Bootstrapping Architecture (GBA) Framework" Mar. 2006.
3GPP2 S.S0114-0 "Security Mechanisms Using GBA" Mar. 2006.
OMA-AD-SUPL-V2 "Secure User Plane Location ArchitectUre" Aug. 31, 2007.

* cited by examiner

REGISTRATION OF A TERMINAL WITH A LOCATION SERVER FOR USER PLANE LOCATION

The present application claims priority to provisional U.S. Application Ser. No. 60/828,902, entitled "IP Address Registration for User Plane Location," filed Oct. 10, 2006, and provisional U.S. Application Ser. No. 60/864,448, entitled "SUPL 2_0 SET Registration with H-SLP," filed Nov. 6, 2006, both assigned to the assignee hereof and incorporated herein by reference.

BACKGROUND

I. Field

The present disclosure relates generally to communication, and more specifically to techniques for supporting location services (LCS) for a terminal.

II. Background

It is often desirable, and sometimes necessary, to know the location of a terminal, e.g., a cellular phone. The terms "location" and "position" are synonymous and are used interchangeably herein. For example, an LCS client may desire to know the location of the terminal and may communicate with a location server in order to request location information for the terminal. The location server may then send a message to the terminal to start a location session. This message may be properly delivered to the terminal based on routing information available for the terminal. The location server and the terminal may then exchange messages, as necessary, to obtain location information for the terminal. The location server may then return the requested location information to the LCS client.

For network-initiated location service as described above, the location server or some other network entity may need routing information for the terminal in order to send the initial message to the terminal. In certain operating scenarios, the routing information for the terminal may not be available due to various reasons, as described below. Nevertheless, it may be desirable to support network-initiated location services even in such scenarios.

SUMMARY

Techniques for supporting network-initiated location services for a terminal are described herein. A location server may be able to reach the terminal based on various messaging mechanisms. However, each mechanism may require the terminal to perform registration with a designated network entity so that routing information is available for the terminal. The location server may not be able to reach the terminal in a normal manner based on any of these messaging mechanisms in certain operating scenarios, as described below.

In an aspect, the terminal may perform registration with the location server if the terminal determines that the location server may not be able to reach the terminal in the normal manner. For example, the terminal may decide to perform registration if it obtains Internet Protocol (IP) connectivity via an access network that is not associated with a home network of the terminal. For the registration, the terminal may identify itself to the location server, instigate mutual authentication of the terminal and the location server, and provide an IP address of the terminal to the location server. The terminal may perform registration with the location server whenever the IP address changes and/or periodically whenever a timer expires. The terminal may set the timer based on a timer value received from the location server. The location server may use the IP address to send messages to the terminal for network-initiated location services.

Various aspects and features of the disclosure are described in further detail below.

DETAILED DESCRIPTION

The techniques described herein may be used for terminals communicating with wireline networks as well as wireless networks. The term "network" and "system" are often used interchangeably. For example, the techniques may be used for wireless networks defined by an organization named "3rd Generation Partnership Project" (3GPP) and wireless networks defined by an organization named "3rd Generation Partnership Project 2" (3GPP2).

The techniques may also be used for various user plane location architectures such as Secure User Plane Location (SUPL) from Open Mobile Alliance (OMA), V1 and V2 user plane from Code Division Multiple Access (CDMA) Development Group (CDG), X.S0024 user plane from 3GPP2, etc. SUPL is applicable for 3GPP, 3GPP2 and WLAN networks. X.S0024, V1 and V2 are applicable for 3GPP2 networks. A user plane is a mechanism for carrying messages/signaling for higher-layer applications and employing a user-plane bearer, which is typically implemented with protocols such as User Datagram Protocol (UDP), Transmission Control Protocol (TCP), and IP, all of which are known in the art. Messages/signaling supporting location services and positioning may be carried as part of data (from a network perspective) in a user plane architecture.

For clarity, certain aspects of the techniques are described below for SUPL. SUPL Version 1.0 (SUPL 1.0) is described in OMA-AD-SUPL-V1, entitled "Secure User Plane Location Architecture," Jun. 15, 2007, and OMA-TS-ULP-V1, entitled "UserPlane Location Protocol," Jun. 15, 2007. SUPL Version 2.0 (SUPL 2.0) is described in OMA-AD-SUPL-V2, entitled "Secure User Plane Location Architecture," Aug. 31, 2007, and OMA-TS-ULP-V2, entitled "UserPlane Location Protocol," Sep. 27, 2007. These SUPL documents are publicly available from OMA.

Figure 1A:
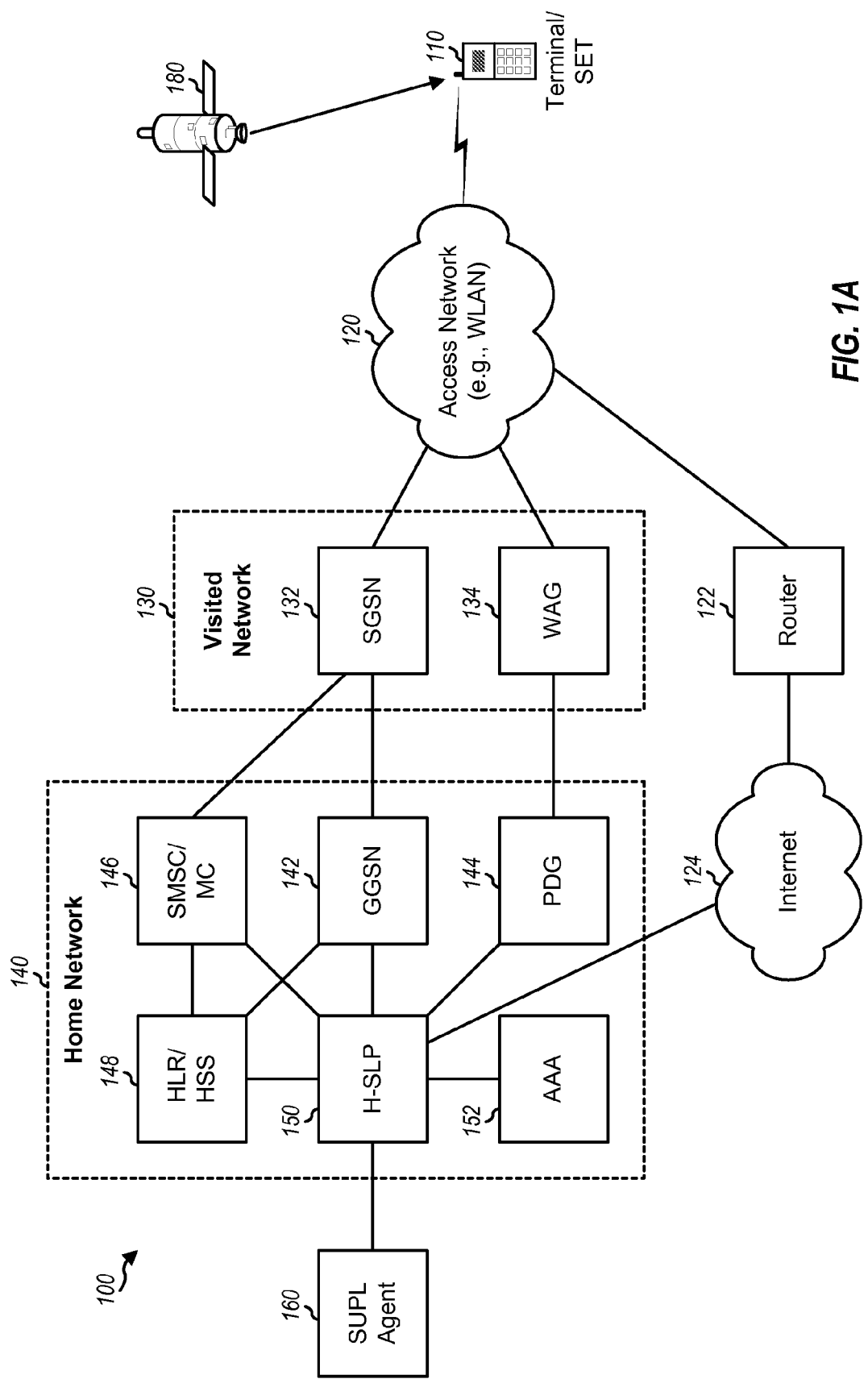
FIGS. 1A and 1B show two example network deployments.

FIG. 1A shows an example network deployment 100. A terminal 110 may communicate with an access network 120 to obtain communication services. Terminal 110 may be stationary or mobile and may also be referred to as a user equipment (UE), a mobile station, an access terminal, a subscriber unit, a station, etc. Terminal 110 may be a cellular phone, a personal digital assistant (PDA), a wireless device, a handheld device, a wireless modem, a laptop computer, a telemetry device, a tracking device, etc. Terminal 110 may communicate with one or more base stations and/or one or more access points in access network 120. Terminal 110 may also receive signals from one or more satellites 180 in a satellite positioning system (SPS), which may be the United States Global Positioning System (GPS), the European Galileo system, the Russian GLONASS system, etc. Terminal 110 may measure signals from base stations in access network 120 and obtain timing measurements for the base stations. Terminal 110 may also measure signals from satellites 180 and obtain pseudo-range measurements for the satellites. The pseudo-range and/or timing measurements may be used to derive a position estimate for terminal 110. A position estimate may also be referred to as a location estimate, a position fix, etc.

Access network 120 supports communication for terminals located within its coverage. Access network 120 may be a wireless network and may also be referred to as a radio network, a radio access network, etc. Access network 120 may be a 3GPP access network, a 3GPP2 access network, a wireless local area network (WLAN), etc. A 3GPP access network may be a Global System for Mobile Communications (GSM) network, a GSM EDGE Radio Access Network (GERAN), a Universal Terrestrial Radio Access Network (UTRAN) utilizing Universal Terrestrial Radio Access (UTRA), e.g., Wideband CDMA (W-CDMA), an Evolved UTRAN (E-UTRAN) utilizing Long Term Evolution (LTE) radio access, etc. A 3GPP2 access network may be a CDMA2000 1X network utilizing cdma2000, CDMA2000 1xEV-DO network, etc. A WLAN may implement a radio technology such as any in the IEEE 802.11 family of standards, Hiperlan, etc. Access network 120 may also be a wireless network supporting other radio technology such as Ultra Mobile Broadband (UMB), IEEE 802.20, Flash-OFDM®, IEEE 802.16 (WiMax), etc. UTRA, E-UTRA and GSM are described in documents from 3GPP. cdma2000 and UMB are described in documents from 3GPP2. 3GPP and 3GPP2 documents are publicly available. Access network 120 may also be a wireline network such as a local area network (LAN), a digital subscriber line (DSL) network, a packet cable network, a telephone network, etc.

Visited network 130 is a network currently serving terminal 110 and may also be referred to as a Visited Public Land Mobile Network (V-PLMN). Visited network 130 may include various network entities that provide data and/or voice connectivity, location services, and/or other functionalities and services. For 3GPP, visited network 130 may include a Serving GPRS Support Node (SGSN) 132 and a WLAN Access Gateway (WAG) 134. SGSN 132 is part of a General Packet Radio Service (GPRS) core network and provides packet-switched services for terminals communicating with a 3GPP access network. WAG 134 is part of a 3GPP Inter-working WLAN (I-WLAN) core network and provides packet-switched services for terminals communicating with a WLAN access network. Visited network 130 may include other 3GPP network entities, e.g., network entities supporting location services and positioning, which are not shown in FIG. 1A for simplicity. For 3GPP2, visited network 130 may include network entities performing similar functions as those for 3GPP but referred to by other names. 3GPP and 3GPP2 generally use different network entities and, for clarity, much of the following description is for 3GPP-based networks.

A home network 140 is a network with which terminal 110 has subscription and may also be referred to as a Home PLMN (H-PLMN). Home network 140 may include various entities that provide data and/or voice connectivity, location services, and/or other functionalities and services. For 3GPP, home network 140 may include a Gateway GPRS Support Node (GGSN) 142, a Packet Data Gateway (PDG) 144, a Short Message Service Center/Message Center (SMSC/MC) 146, a Home Location Register/Home Subscriber Server (HLR/HSS) 148, a Home SUPL Location Platform (H-SLP) 150, and an Access, Authorization, and Accounting (AAA) server 152. GGSN 142 performs functions such as routing and filtering to support packet-switched services. PDG 144 supports inter-working between 3GPP and WLAN and performs functions such as traffic security, IP address assignment, etc. SMSC/MC 146 supports Short Message Service (SMS) and delivers SMS messages for terminals. HLR/HSS 148 stores subscription-related information for terminals for which network 140 is the home network. HLR/HSS 148 also stores registration information and provides routing information for network-initiated calls and SMS for terminals in home network 140, e.g., whenever requested by network entities in visited network 130. H-SLP 150 supports SUPL for terminals in home network 140. AAA server 152 authorizes terminals for services and performs accounting and billing functions. Home network 140 may include other 3GPP network entities that are not shown in FIG. 1A for simplicity.

Access network 120 (e.g., a WLAN) may exchange packets with a router 122, which may be coupled to the Internet 124. H-SLP 150 may communicate with other entities via the Internet 124, e.g., with terminal 110 via the Internet 124, router 122, and access network 120.

Figure 1B:
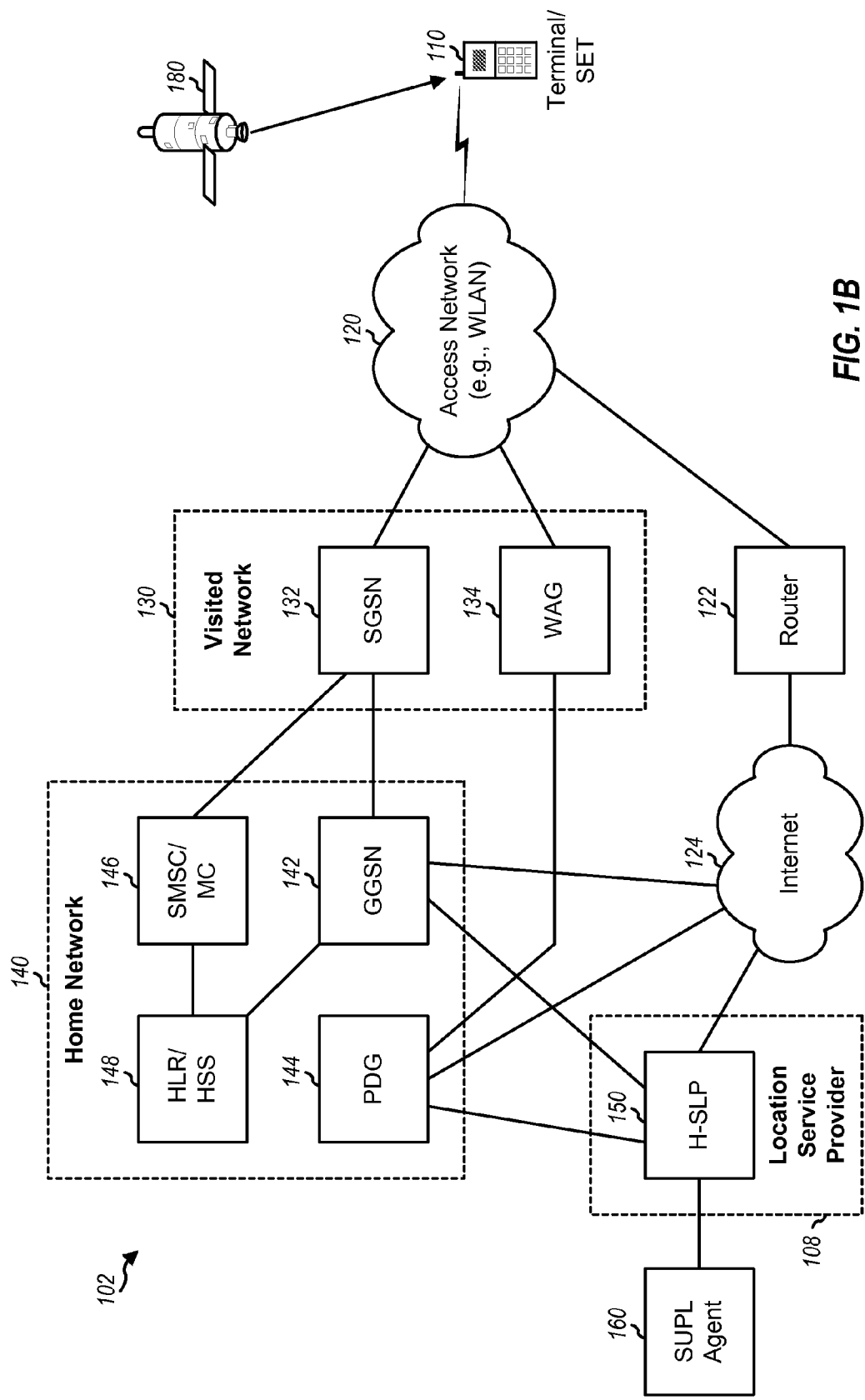

FIG. 1B shows another example network deployment 102. In deployment 102, H-SLP 150 may be operated by a location service provider 108 that may not be the home network operator for terminal 110. Terminal 110 may or may not have a home network. GGSN 142, PDG 144 and H-SLP 150 may be coupled to the Internet 124. Terminal 110 may communicate with H-SLP 150 via visited network 130 and home network 140, e.g., via access network 120, SGSN 132, GGSN 142, and the Internet 124. Terminal 110 may also communicate with H-SLP 150 via access network 120, router 122, and the Internet 124.

FIGS. 1A and 1B show two example network deployments supporting communication between terminal 110 and H-SLP 150. Terminal 110 may also communicate with H-SLP 150 in other network deployments involving other combinations of networks and/or network entities.

Figure 2:
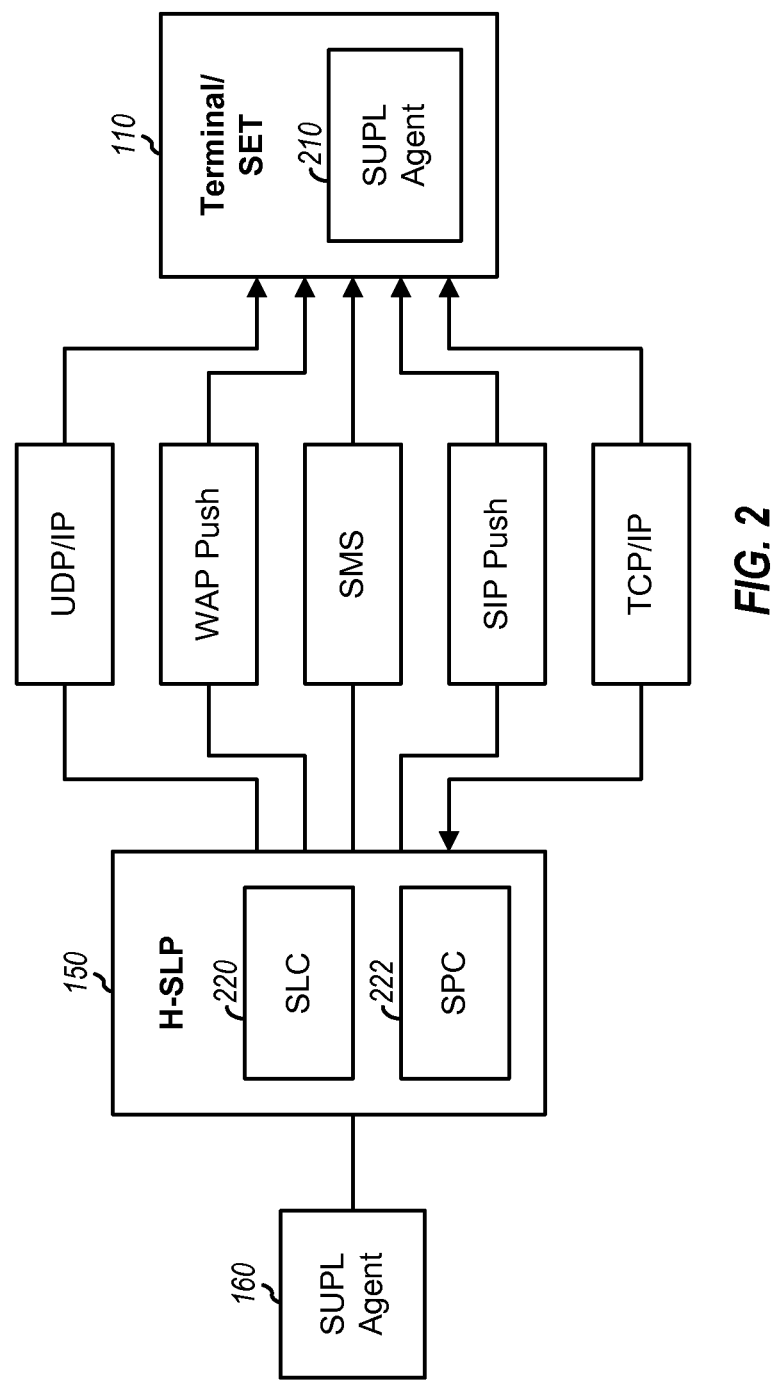
FIG. 2 shows communication between a terminal and a location server.

FIG. 2 shows communication between terminal 110 and H-SLP 150. Terminal 110 supports SUPL for location services and positioning and is referred to as a SUPL enabled terminal (SET) in SUPL. Terminal 110 may have a SUPL agent 210 that is resident within the terminal. A SUPL agent is a service access point that accesses network resources to obtain location information. A SUPL agent may contain a Mobile Location Services (MLS) application, which may include protocols used for communication between the SUPL agent and an H-SLP. H-SLP 150 may include a SUPL Location Center (SLC) 220 that supports location services for terminals in home network 140 and visited network 130 and a SUPL Positioning Center (SPC) 222 that supports positioning for these terminals. A SUPL agent 160 may communicate with H-SLP 150 to obtain location information for terminal 110.

SUPL supports SET-initiated services and network-initiated services. SET-initiated services are services that originate from a SET, with the SUPL agent residing within the SET. Network-initiated services are services that originate from within a SUPL network, with the SUPL agent residing in the network.

SUPL supports 1-way communication from H-SLP 150 to terminal 110, which may be used by H-SLP 150 to send a SUPL INIT message to terminal 110 to start a network-initiated location session. H-SLP 150 may send the SUPL INIT message using various mechanisms including UDP/IP, Wireless Application Protocol (WAP) Push, SMS, and Session Initiation Protocol (SIP) Push. For UDP/IP, H-SLP 150 may send the SUPL INIT message to terminal 110 via various network entities, as described below for TCP/IP. For WAP Push, H-SLP 150 may send the SUPL INIT message to terminal 110 via WAP Push Proxy Gateway (PPG) or via WAP PPG coupled to SMSC/SC 146. For SMS, H-SLP 150 may send the SUPL INIT message to terminal 110 via SMSC/SC 146, SGSN 132, and access network 120. For SIP Push, H-SLP 150 may send the SUPL INIT message to terminal 110 via a SIP/IP core.

SUPL also supports 2-way communication between terminal 110 and H-SLP 150 using TCP/IP. The 2-way communication may be used to exchange SUPL messages between terminal 110 and H-SLP 150 for registration, location services, positioning, etc. For 3GPP GPRS, SUPL messages may be exchanged using TCP/IP between terminal 110 and H-SLP 150 via GGSN 142, SGSN 132, and access network 120, which may be a GSM network, a GERAN, a UTRAN, etc. For 3GPP I-WLAN, SUPL messages may be exchanged using TCP/IP between terminal 110 and H-SLP 150 via PDG 144, WAG 134, and access network 120, which may be a WLAN. SUPL messages may also be exchanged between terminal 110 and H-SLP 150 via the Internet 124, router 122, and access network 120, which may be a WLAN, a LAN, a DSL network, a packet cable network, etc. 1-way and 2-way communication between terminal 110 and H-SLP 150 is described in detail in the aforementioned OMA-AD-SUPL-V2 document.

For SET-initiated services, terminal 110 may send a SUPL START message to H-SLP 150 to start a location session. Terminal 110 may be provisioned with an IP address of H-SLP 150 and may send the SUPL START message to the H-SLP using this provisioned IP address. In general, an IP address may be a 32-bit IP Version 4 (IPv4) address or a 128-bit IP Version 6 (IPv6) address. Alternatively, terminal 110 may be provisioned with a fully qualified domain name (FQDN) of H-SLP 150 and may use Domain Name System (DNS) to obtain the IP address of the H-SLP. Terminal 110 may then send the SUPL START message to H-SLP 150 using the fetched IP address.

For network-initiated services, H-SLP 150 may send a SUPL INIT message to terminal 110 to start a location session using any of the 1-way communication mechanisms shown in FIG. 2. H-SLP 150 may use UDP/IP if the IP address of terminal 110 is known to the H-SLP or can be obtained by the H-SLP, e.g., from HLR/HSS 148, GGSN 142, or AAA server 152. H-SLP 150 may then send the SUPL INIT message to terminal 110 using the IP address of the terminal. H-SLP 150 may use SIP Push if terminal 110 has performed SIP registration with home network 140 and routing information for terminal 110 is available, e.g., from HLR/HSS 148. H-SLP 150 may use SMS or WAP Push if terminal 110 has performed wireless access registration (e.g., GSM, UMTS, or CDMA registration) with home network 140 and routing information for terminal 110 is available, e.g., from HLR/HSS 148.

For normal SUPL, H-SLP 150 may send a SUPL INIT message to terminal 110 using SMS, WAP Push, or SIP Push without knowing the IP address of the terminal. H-SLP 150 may receive the IP address of terminal 110 later after the terminal establishes a secure IP connection to the H-SLP. However, as noted above, H-SLP 150 may use SMS or WAP Push only if terminal 110 has performed wireless access registration and may use SIP Push only if terminal 110 has performed SIP registration. H-SLP 150 may send the SUPL INIT message to terminal 110 using UDP/IP but would need to first obtain the IP address of terminal 110, e.g., by querying HLR/HSS 148 and/or other network entities such as GGSN 142, AAA server 152 (for WLAN access), etc. For IP access via 3GPP or 3GPP2-based network, the IP address of terminal 110 may be obtainable from HLR/HSS 148 or via a Dynamic DNS (DDNS) server. However, the IP address of terminal 110 may not be practically obtainable by H-SLP 150 if DDNS is not supported by the network entities normally providing DDNS support.

In some scenarios, terminal 110 may have communication access, e.g., via a WLAN, a LAN, a DSL, etc., but it may not be possible for H-SLP 150 to initiate a location session with terminal 110 by use of UDP/IP, WAP Push, SMS, or SIP Push. This may occur if H-SLP 150 cannot determine the IP address of terminal 110, and terminal 110 is accessing a network that does not (entirely or correctly) support inter-working with WAP Push, SMS, or SIP Push, or does not support the types of registration described above needed to enable these transfers. In such scenarios, location requests initiated by SUPL agent 160 via H-SLP 150 would fail.

The scenarios described above may occur if terminal/SET 110 is not registered or not fully registered with HLR/HSS 148 in home network 140 when accessing packet mode IP-based services. Terminal 110 may not be registered or fully registered in any of the following user cases or situations:

(a) A user of terminal 110 has a temporary or permanent subscription to more than one Internet service provider (ISP) and/or VoIP provider and receives service from a provider that is neither its home operator nor a roaming partner of the home operator. For example, the user may be using a hotel or airport WLAN, a wireline-based VoIP provider, or a company-provided LAN/VoIP capability.
 (b) The user accesses a WLAN with an association to home network 140 but chooses to use a WLAN Direct IP Access mode in which home network 140 provides AAA support but does not provide or receive the IP address of terminal 110.
 (c) Terminal 110 receives TCP/IP access via another end device. For example, terminal/SET 110 may reside on a laptop computer that obtains TCP/IP access via an IP-enabled cellular phone.
 (d) Terminal 110 receives TCP/IP access via a virtual private network (VPN); e.g., via a VPN tunnel to a corporate LAN.

For the user cases described above, WAP Push and SMS would not work and UDP/IP would only work if H-SLP 150 already has the IP address of terminal 110; e.g., from a previous SET-initiated location session if there happened to be one. Furthermore, for the deployment shown in FIG. 1B, the 1-way communication from H-SLP 150 to terminal 110 using UDP/IP, SMS, WAP Push, or SIP Push shown in FIG. 2 may not be possible because H-SLP 150 is not part of home network 140 and may seldom have the IP address of terminal 110.

In an aspect, terminal/SET 110 may register its current IP address with H-SLP 150 in order to support network-initiated location services for the user cases described above and possibly other user cases. Terminal 110 may perform registration with H-SLP 150 whenever terminal 110 communicates with an access network that does not provide normal inter-working with home network 140. Upon detecting this situation, terminal 110 may perform registration with H-SLP 150 and provide its IP address to the H-SLP, which may use this IP address to send messages to terminal 110 for network-initiated services.

Terminal 110 may perform registration with H-SLP 150 for any kind of access (e.g., via WLAN, W-CDMA, LAN, DSL, etc.) for the deployment shown in FIG. 1B. For the normal case in which H-SLP 150 is part of home network 140, as shown in FIG. 1A, the need for registration with H-SLP 150 may be less common. However, for the case shown in FIG. 1B, registration with H-SLP 150 may always be needed. The registration with H-SLP 150 enables SUPL support by location service provider 108 that is different from the home network operator. Terminal 110 may be triggered to initiate registration with H-SLP 150 on a continual periodic basis, or as instructed by the H-SLP (e.g., the H-SLP may send information on when or how often to perform registration), etc.

Figure 3:
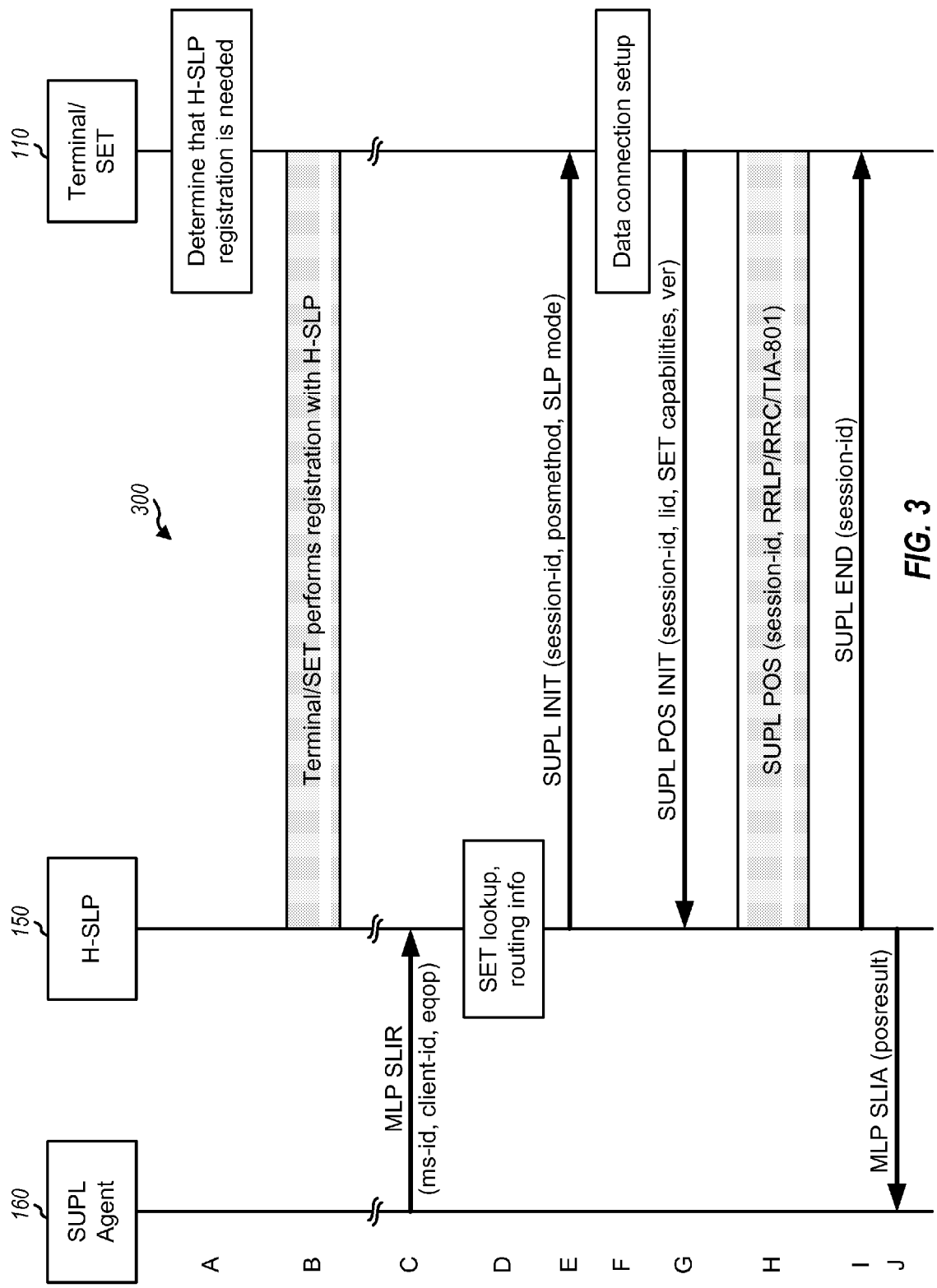
FIG. 3 shows a message flow for network-initiated location service.

FIG. 3 shows a design of a message flow 300 for network-initiated location services with H-SLP registration. Terminal 110 may initially detect that it may not be reachable in the normal manner via UDP/IP, WAP Push, SMS, or SIP Push by H-SLP 150 and that registration with the H-SLP is desired or necessary (step A). For example, terminal 110 may decide to perform registration with H-SLP 150 when terminal 110 acquires IP connectivity using neither its home network nor a roaming partner of its home network. Terminal 110 may then perform registration with H-SLP 150 and may provide its IP address to the H-SLP, as described below (step B).

At a later time, SUPL agent 160 may desire location information for terminal 110 and may send a Mobile Location Protocol (MLP) Standard Location Immediate Request (SLIR) message to H-SLP 150 (step C). H-SLP 150 may authenticate and authorize SUPL agent 160 for the requested location service. H-SLP 150 may then obtain routing information for terminal 110, which is the target SET (step D). Since terminal 110 has registered its IP address with H-SLP 150, the routing information may comprise the IP address of the terminal.

H-SLP 150 may then initiate a location session with terminal 110 by sending a SUPL INIT message using the IP address of the terminal (step E). WAP Push, SMS and SIP Push may not be available to send the SUPL INIT message in this case. H-SLP 150 may be able to use UDP/IP to send the SUPL INIT message (because it has the IP address of terminal 110) or may be able to use TCP/IP if the TCP/IP connection used for the H-SLP registration in step B is still open (i.e., was not closed). The SUPL INIT message may contain a session-id used to identify the location session, an intended positioning method, the desired quality of positioning (QoP), etc. Upon receiving the SUPL INIT message, terminal 110 may perform a data connection setup procedure and attach itself to a packet data network if the terminal is not already attached (step F). Terminal 110 may then establish a secure TCP/IP connection to H-SLP 150 (also step F) if a secure TCP/IP connection is not already open (e.g., was not used to send the SUPL INIT message in step E). Terminal 110 may then send a SUPL POS INIT message to start a positioning session with H-SLP 150 (step G). The SUPL POS INIT message may include the session-id, SET capabilities (e.g., supported positioning methods and protocols), request for assistance data, etc.

Terminal 110 and H-SLP 150 may then exchange messages for a SUPL positioning session (step H). For SET-assisted positioning, H-SLP 150 may calculate a position estimate for terminal 110 based on positioning measurements received from the terminal. For SET-based positioning, terminal 110 may calculate the position estimate based on assistance obtained from H-SLP 150. In any case, upon completing the position calculation, H-SLP 150 may send a SUPL END message to inform terminal 110 that no further positioning procedure will be started and that the location session is finished (step I). Terminal 110 may then release the secure TCP/IP connection to H-SLP 150 and may also release resources related to the location session. H-SLP 150 may send the requested location information in an MLP Standard Location Immediate Answer (SLIA) message to SUPL agent 160 and may release resources related to the location session.

FIG. 3 shows an example message flow for one case of network-initiated location service with H-SLP registration. H-SLP registration may also be used to support other message flows for other cases of network-initiated location services, which may cover roaming and non-roaming, proxy and non-proxy modes, triggered and non-triggered services, etc. SUPL agent 160 may communicate directly with H-SLP 150 for roaming and non-roaming scenarios or indirectly with H-SLP 150 via a Requesting SLP (R-SLP). SPC 222 may communicate directly with terminal 110 in the non-proxy mode and may communicate indirectly with terminal 110 via SLC 220 in the proxy mode. H-SLP 150 may provide location information for terminal 110 to SUPL agent 160 once for non-triggered services and possibly more than once based on event or timer triggers for triggered services. In general, registration with H-SLP 150 may be performed for each of the various network-initiated message flows described in the aforementioned OMA-TS-ULP-V1 and OMA-TS-ULP-V2 documents.

Figure 4:
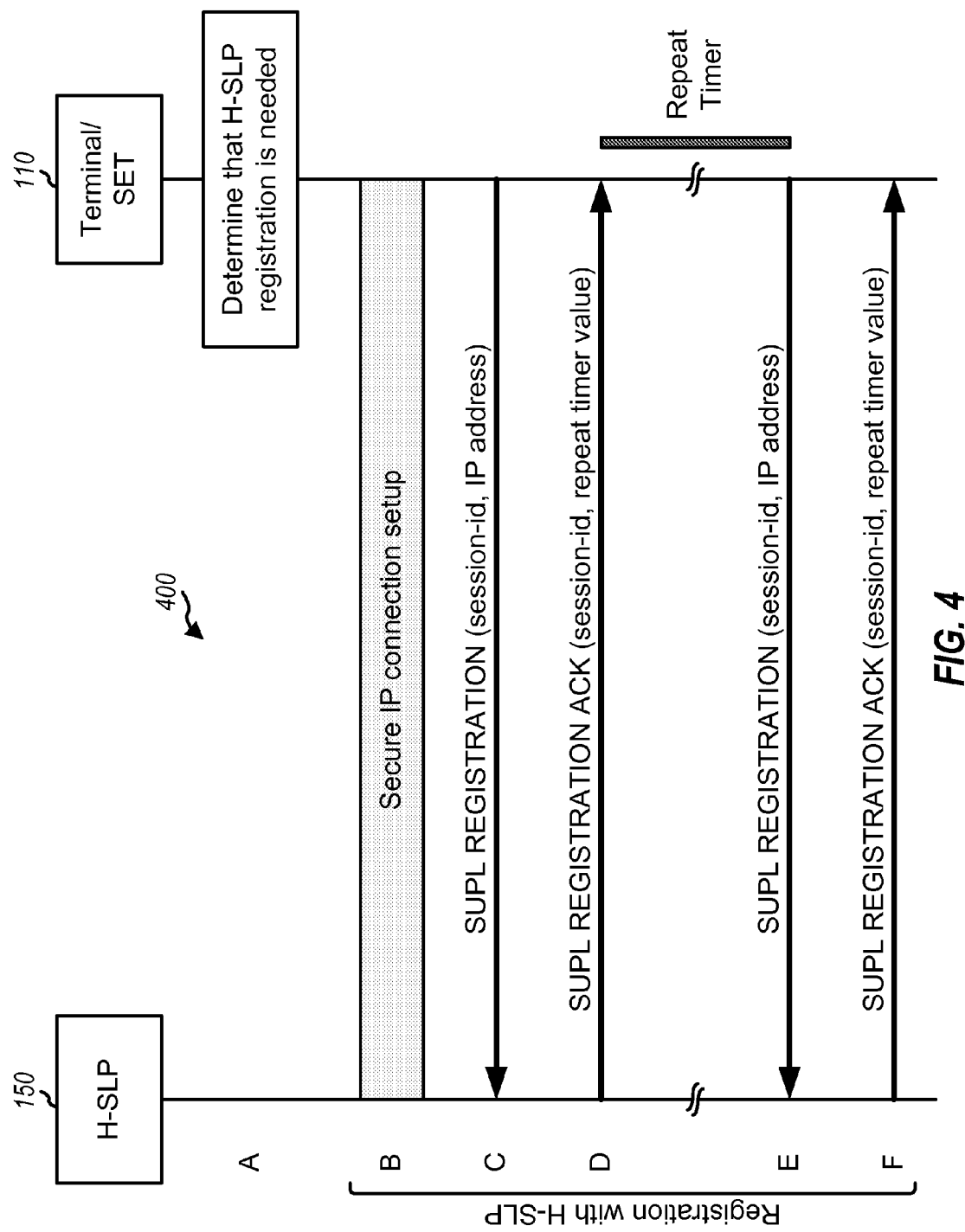
FIG. 4 shows a message flow for registration with the location server.

FIG. 4 shows a design of a message flow 400 for registration with H-SLP 150, which may be used for step B in FIG. 3. Terminal 110 may obtain IP connectivity via an access network that is not its home network or a roaming partner of its home network. Terminal 110 may then decide to instigate registration with H-SLP 150 (step A).

For the H-SLP registration, terminal 110 may establish a secure TCP/IP connection to H-SLP 150 using an IP address of the H-SLP, which may be provisioned at terminal 110 by home network 140 or may be obtained by the terminal in other manners (step B). A secure IP connection may be established in various manners, as described below. Terminal 110 may then send a SUPL REGISTRATION message to register its IP address with H-SLP 150 (step C). The SUPL REGISTRATION message may include a session-id identifying the current session, the IP address of terminal 110, etc. For Mobile IP, the IP address of terminal 110 may be a remote IP address assigned by a home agent (HA) within home network 140. H-SLP 150 may return a SUPL REGISTRATION ACK message containing a repeat timer (RT) value to terminal 110 (step D).

Terminal 110 may periodically perform registration with H-SLP 150 based on a repeat timer. For example, terminal 110 may set the repeat timer to the repeat timer value obtained from the SUPL REGISTRATION ACK message and may perform registration with H-SLP 150 when the repeat timer expires or whenever the IP address of terminal 110 changes. For each H-SLP registration, terminal 110 may establish a secure IP connection to H-SLP 150 if this connection was released or may retain and reuse the previous secure IP connection. Terminal 110 may then send a SUPL REGISTRATION message with the current IP address of the terminal to H-SLP 150 (step E). H-SLP 150 may return a SUPL REGISTRATION ACK message with the same or different repeat timer value to terminal 110 (step F). Terminal 110 may skip or cancel registration with H-SLP 150 (steps E and F) if the terminal obtains IP connectivity from home network 140 or a roaming partner of the home network.

In general, terminal 110 may perform registration with H-SLP 150 just once (e.g., upon obtaining IP connectivity via an access network that is not associated with the home network) or multiple times (e.g., every time the repeat timer expires or the IP address of the terminal changes). A repeat timer value may or may not be sent in a SUPL REGISTRATION ACK message. If sent, the repeat timer value may be selected based on the expected life of the IP address of terminal 110 and/or other factors. The repeat timer value may also be constrained to be within a range of minimum and maximum values. In between steps D and E in FIG. 4, H-SLP 150 and/or terminal 110 may or may not instigate release of the secure IP connection established in step B.

H-SLP 150 may also provide other information in a SUPL REGISTRATION ACK message to assist terminal 110 in deciding when to perform registration again. For example, H-SLP 150 may include a flag in the SUPL REGISTRATION ACK message directing terminal 110 to send a SUPL REGISTRATION message if a new IP address is assigned to terminal 110. H-SLP 150 may include a different flag (e.g., no flag) in the SUPL REGISTRATION ACK message to direct terminal 110 to not send a SUPL REGISTRATION message if a new IP address is assigned to terminal 110. Such additional information in the SUPL REGISTRATION ACK message may be used by H-SLP 150 to ensure that it has the current IP address of terminal 110 and to limit the frequency of the SUPL REGISTRATION messages in order to avoid a network overload situation.

FIG. 4 shows the use of the SUPL REGISTRATION message for registration with H-SLP 150. In general, terminal 110 may send any message that carries the IP address of the terminal explicitly (e.g., in a payload) and/or implicitly (e.g., in a source address). Terminal 110 may send this message after a secure IP connection is established, while it is being established, or just before it is established.

Terminal 110 may be assigned an IP address based on various mechanisms known in the art. This assigned IP address may be referred to as a private IP address. Terminal 110 may communicate with access network 120, which may perform network address translation (NAT) and may map the private IP address of terminal 110 to a public IP address that can be used by external entities to send IP packets to terminal 110. NAT may be used for various purposes such as security (e.g., to prevent unauthorized IP access to terminal 110), enable sharing of the same public IP address by several terminals, etc. Terminal 110 may not be aware of NAT being performed by access network 120 and may also not be aware of the public IP address used for the terminal.

Figure 5:
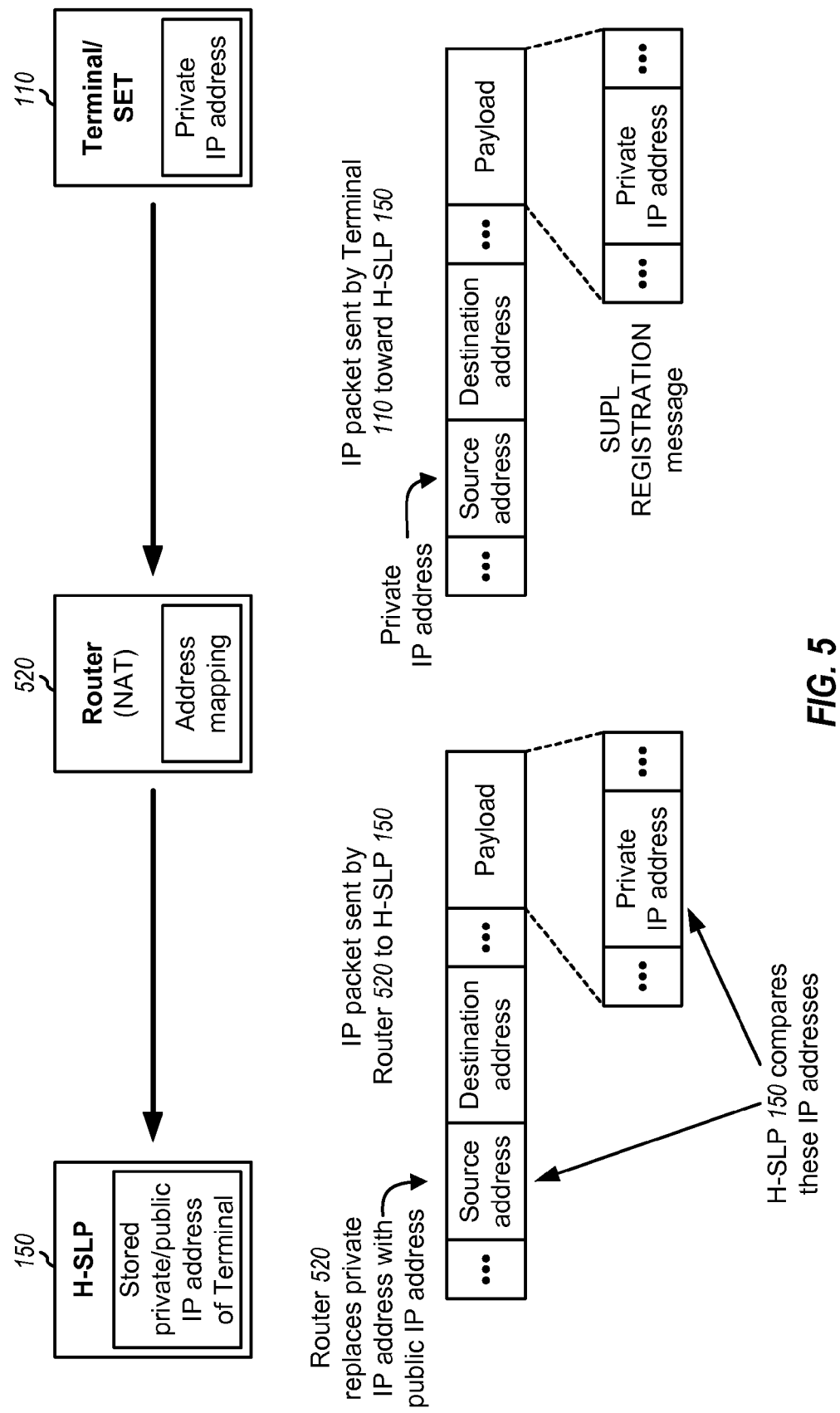
FIG. 5 shows communication between the terminal and the location server with network address translation (NAT).

FIG. 5 shows communication between terminal 110 and H-SLP 150 with NAT. Terminal 110 may exchange IP packets with H-SLP 150 via a router/gateway 520 in access network 120 and other network entities, which are not shown in FIG. 5 for simplicity. For registration with H-SLP 150 in FIG. 4, terminal 110 may send one or more IP packets for the SUPL REGISTRATION message (step C) to H-SLP 150 via router 520. Each IP packet sent by terminal 110 may have (i) a source address field set to the private IP address of terminal 110, (ii) a destination address field set to the IP address of H-SLP 150, and (iii) a payload field carrying the SUPL REGISTRATION message, which may include the private IP address of terminal 110. Router 520 may receive the IP packet(s) from terminal 110, perform NAT, replace the private IP address in each IP packet with the public IP address for terminal 110, and send the IP packet(s) to H-SLP 150.

H-SLP 150 may receive the IP packet(s) from router 520, extract the public IP address from the source address field, and extract the private IP address from the SUPL REGISTRATION message sent in the payload field. H-SLP 150 may compare the two IP addresses. If these IP addresses match, then H-SLP 150 may assume that a valid IP address has been received for terminal 110. If these IP addresses differ, then H-SLP 150 may assume that NAT was performed and may use the public IP address obtained from the source address field of the IP packet(s). H-SLP 150 may maintain the secure IP connection established in step B in FIG. 4 in order to avoid the risk of losing the capability to send IP packets to terminal 110 due to packet filtering by router 520. Alternatively or additionally, H-SLP 150 may provide a smaller repeat timer value to terminal 110 to more frequently verify that the terminal still has the same public IP address. If NAT is performed, then a smaller repeat timer value may also help avoid removal of the public-private IP address binding for terminal 110 in router 520 due to lack of IP traffic to and from the terminal. The repeat timer value may be selected to be smaller than the duration of the public-private IP address binding by router 520, if known.

For registration within H-SLP 150, terminal 110 may establish a secure IP connection to H-SLP 150 prior to sending the SUPL REGISTRATION message. For the secure IP connection establishment, terminal 110 may first establish an IP connection to H-SLP 150. Terminal 110 and H-SLP 150 may then perform mutual authentication in order to authenticate one another. The mutual authentication may be performed based on various mechanisms.

In one design that is applicable for 3GPP and 3GPP2, Transport Layer Security (TLS) may be used for mutual authentication of terminal 110 and H-SLP 150. TLS may be used if terminal 110 has performed wireless access registration, e.g., for GSM, UMTS, CDMA, etc. H-SLP 150 may authenticate terminal 110 by verifying that the IP address of the terminal is valid, e.g., by querying GGSN 142 or AAA server 152. H-SLP 150 may also provide a public key certificate to terminal 110 (using TLS) to allow the terminal to authenticate the H-SLP. TLS is described in IETF RFC 2246, entitled "The TLS Protocol," January 1999, which is publicly available.

In another design that is applicable for 3GPP2, Pre-Shared Key (PSK) TLS (PSK-TLS) may be used for mutual authentication of terminal 110 and H-SLP 150. PSK-TLS relies on a shared secret key that is pre-stored securely in both terminal 110 and H-SLP 150. PSK-TLS is described in IETF RFC 4279, entitled "Pre-Shared Key Ciphersuites for Transport Layer Security (TLS)," December 2005, which is publicly available. The PSK-TLS authentication procedure is defined in SUPL 1.0 and SUPL 2.0 for 3GPP2 and may be extended to 3GPP.

In yet another design that is applicable for 3GPP and 3GPP2, a variant of a PSK-TLS Generic Bootstrap Architecture (GBA) procedure defined for SUPL 1.0 may be used for mutual authentication of terminal 110 and H-SLP 150. For the PSK-TLS GBA procedure, terminal 110 and H-SLP 150 both support GBA and can obtain a secure shared key from a Bootstrapping Server Function (BSF) in home network 140. This key may then be used to support PSK-TLS mutual authentication of terminal 110 and H-SLP 150, as described in 3GPP TS 33.222 or 3GPP2 TSG-S draft S.P0114. The key may also be used to support TLS with HTTP Digest authentication, or just HTTP Digest authentication between terminal 110 and H-SLP 150, or some other forms of authentication. The GBA procedure involves terminal 110, H-SLP 150, and the BSF in home network 140. Hence, there may be no impact to both access network 120 and visited network 130. GBA is described in 3GPP2 S.S0109-0, entitled "Generic Bootstrapping Architecture (GBA) Framework," March 2006, 3GPP2 S.S0114-0, entitled "Security Mechanisms using GBA," March 2006, 3GPP TS 33.220, entitled "Generic Authentication Architecture (GAA); Generic Bootstrapping Architecture," and 3GPP TS 33.222, entitled "Generic Authentication Architecture (GAA); Access to network application functions using Hypertext Transfer Protocol over Transport Layer Security (HTTPS)." These documents are publicly available.

In general, mutual authentication of terminal 110 and H-SLP 150 may be supported with GBA, a PSK-TLS alternative, etc. The capability to perform mutual authentication may support network-initiated location services for the user cases described above as well as SET-initiated location services that may require mutual authentication during establishment of a secure IP connection.

Figure 6:
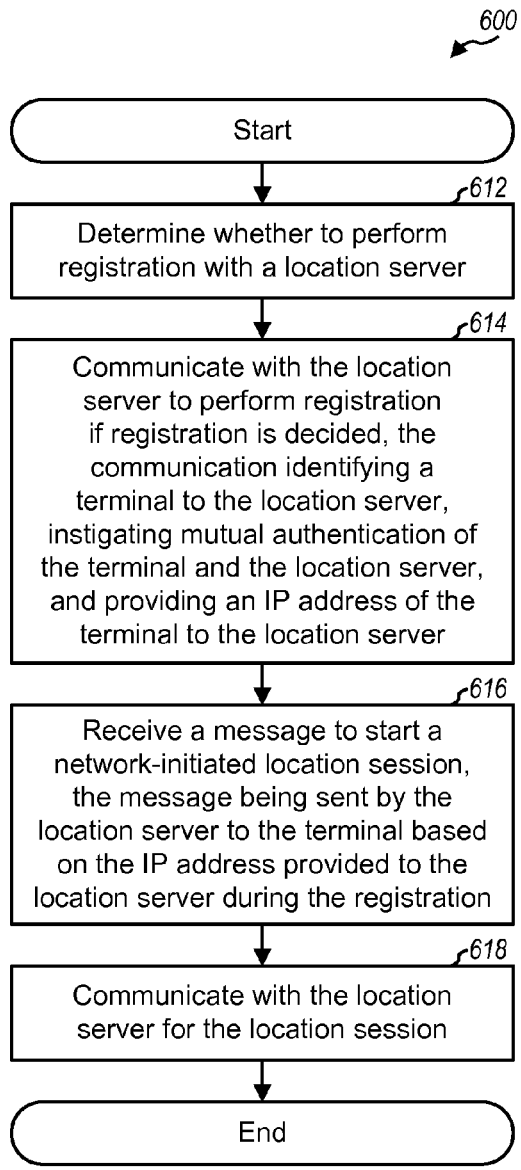
FIG. 6 shows a process performed by a terminal for registration.

FIG. 6 shows a design of a process 600 performed by a terminal, e.g., a SET in SUPL. The terminal may initially determine whether to perform registration with a location server (block 612). The terminal may decide to perform registration if it obtains IP connectivity via (i) an access network that is not associated with a home network of the terminal, (ii) a WLAN or a wired network, or (iii) some other access network. The terminal may also decide to perform registration if the location server is operated by a service provider that is not the home network operator. The location server may be an H-SLP in SUPL, a Gateway Mobile Location Center (GMLC) in 3GPP, a Mobile Positioning Center (MPC) in 3GPP2, etc. The terminal may communicate with the location server to perform registration if registration is decided (block 614). The communication for the registration may identify the terminal to the location server, instigate mutual authentication of the terminal and the location server, and provide an IP address of the terminal to the location server. The IP address may be used by the location server to send messages to the terminal for network-initiated location services.

The terminal may establish a secure IP connection with the location server and may send the IP address of the terminal via the secure IP connection to the location server. The terminal may maintain the secure IP connection for a subsequent registration or location session with the location server. The terminal may perform registration with the location server if the IP address changes. The terminal may also receive a timer value from the location server, set a timer based on the timer value, and perform registration when the timer expires.

The terminal may receive a message to start a network-initiated location session, with the message being sent by the location server to the terminal based on the IP address provided to the location server during the registration (block 616). The terminal may communicate with the location server for the location session (block 618).

Figure 7:
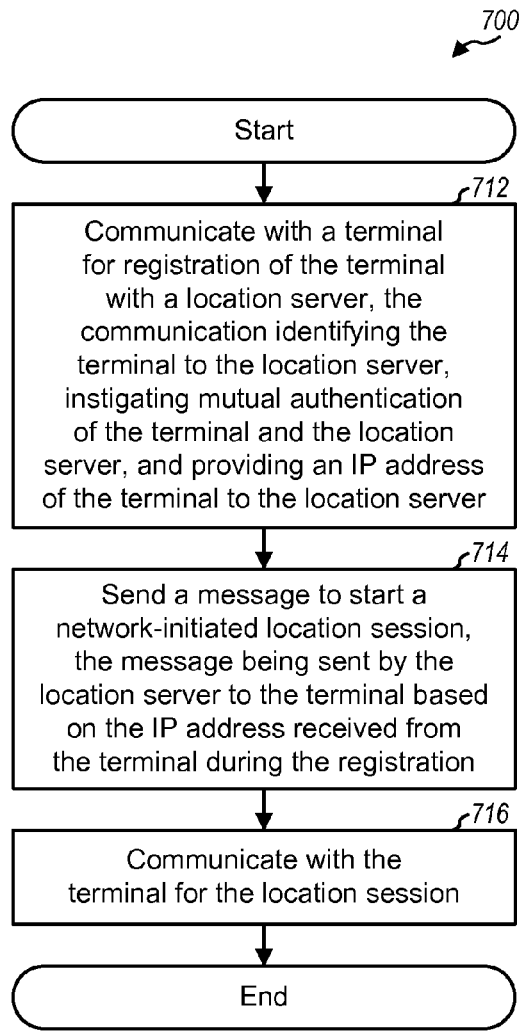
FIG. 7 shows a process performed by a location server for registration.

FIG. 7 shows a design of a process 700 performed by a location server, e.g., an H-SLP, a GMLC, an MPC, etc. The location server may communicate with a terminal for registration of the terminal with the location server (block 712). The communication may identify the terminal to the location server, instigate mutual authentication of the terminal and the location server, and provide an IP address of the terminal to the location server. The location server may receive at least one IP packet from the terminal, obtain a first IP address from a source address field of the IP packet(s), obtain a second IP address from a payload of the IP packet(s), and compare the first and second IP addresses. The location server may use the second IP address as the IP address of the terminal if the first and second IP addresses match and may use the first IP address as the IP address of the terminal if the first and second IP addresses do not match. The location server may send a timer value to the terminal during the registration, and the terminal may use the timer value to perform a subsequent registration with the location server.

The location server may send a message to start a network-initiated location session (block 714). The message may be sent to the terminal based on the IP address received from the terminal during the registration. The location server may then communicate with the terminal for the location session (block 716).

Figure 8:
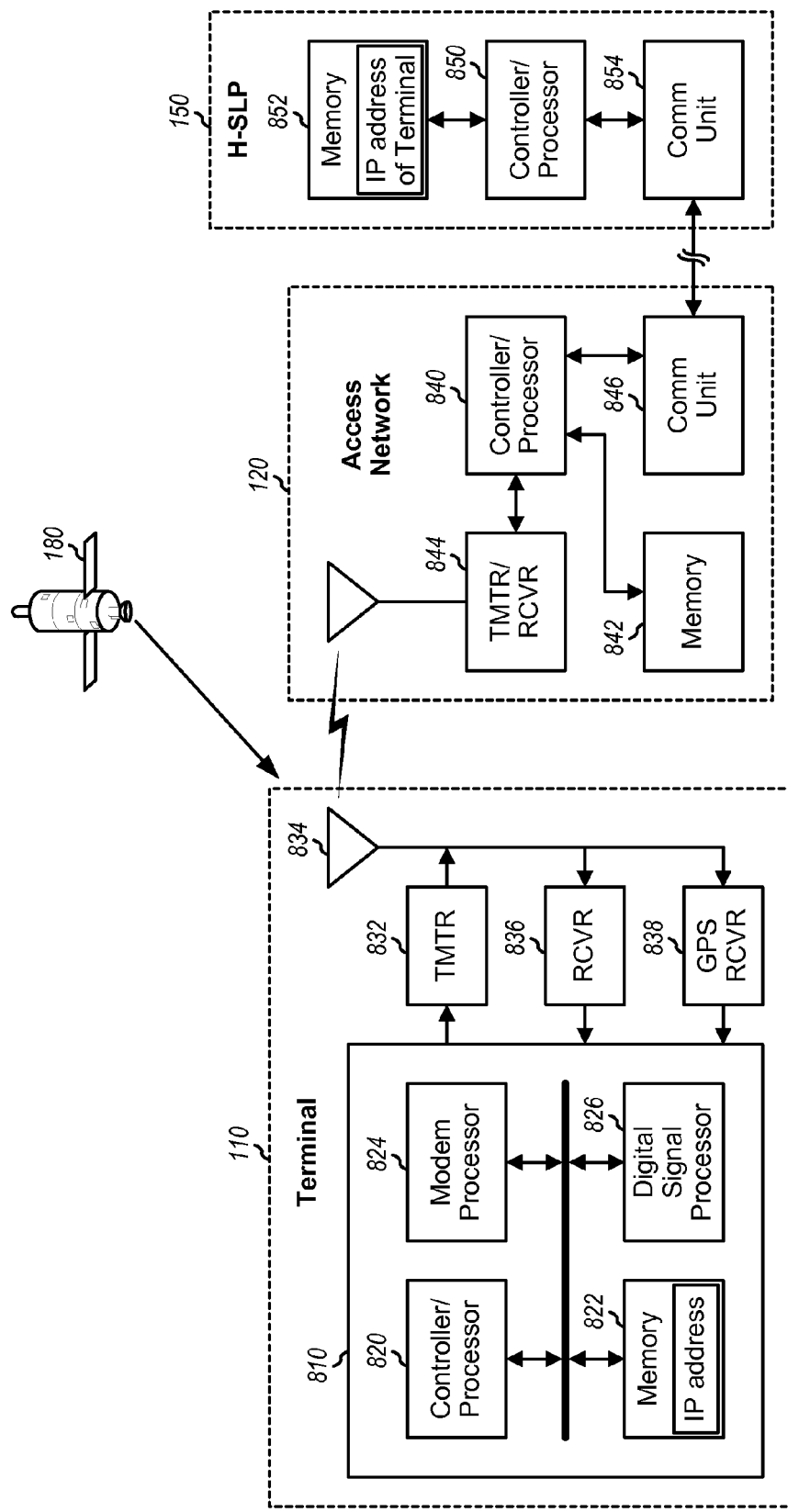
FIG. 8 shows a block diagram of the terminal, an access network, and the location server.

FIG. 8 shows a block diagram of a design of terminal 110, access network 120, and H-SLP 150 in FIGS. 1A and 1B. At terminal 110, a modem processor 824 may receive data to be sent by terminal 110, process (e.g., encode and modulate) the data, and generate output chips. A transmitter (TMTR) 832 may condition (e.g., convert to analog, filter, amplify, and frequency upconvert) the output chips and generate an uplink signal, which may be transmitted via an antenna 834. On the downlink, antenna 834 may receive downlink signals from access network 120. A receiver (RCVR) 836 may condition (e.g., filter, amplify, frequency downconvert, and digitize) the received signal from antenna 834 and provide samples. Modem processor 824 may process (e.g., demodulate and decode) the samples and provide decoded data. Modem processor 824 may perform processing in accordance with a radio technology (e.g., W-CDMA, CDMA 1X, GSM, 802.11, etc.) utilized by access network 120. A digital signal processor 826 may perform various types of processing for terminal 110.

A GPS receiver 838 may receive and condition signals from satellites 180. These measurements may be processed to obtain an accurate location estimate for terminal 110. A coarse location estimate for terminal 110 may also be determined based on pilots received from base stations in access network 120.

A controller/processor 820 may direct the operation at terminal 110. Controller/processor 820 may perform processing for terminal 110 in message flow 300 in FIG. 3 and message flow 400 in FIG. 4. Controller/processor 820 may also perform process 600 in FIG. 6 and/or other processes for the techniques described herein. A memory 822 may store program codes, data, and an IP address of terminal 110. Processors 820, 824 and 826 and memory 822 may be implemented on an application specific integrated circuit (ASIC) 810.

For simplicity, FIG. 8 shows one controller/processor 840, one memory 842, one transmitter/receiver (TMTR/RCVR) 844, and one communication (Comm) unit 846 for access network 120. In general, access network 120 may include any number of controllers, processors, memories, transmitters, receivers, communication units, etc. Controller/processor 840 may perform various functions for communication with the terminals, memory 842 may store program codes and data for access network 120, transmitter/receiver 844 may support radio communication with the terminal, and communication unit 846 may support communication with other network entities.

FIG. 8 also shows a design of H-SLP 150. H-SLP 150 may include a controller/processor 850 that may perform various functions to support location services and/or positioning, a memory 852 that may store program codes and data for H-SLP 150, and a communication unit 854 that may support communication with other network entities. Controller/processor 850 may perform processing for H-SLP 150 in message flow 300 in FIG. 3 and message flow 400 in FIG. 4. Controller/processor 850 may also perform process 700 in FIG. 7 and/or other processes for the techniques described herein. Memory 852 may store the IP address of terminal 110, which may be received during registration performed by the terminal.

The techniques described herein may be implemented by various means depending upon the application. For example, these techniques may be implemented in hardware, firmware, software, or a combination thereof. For a hardware implementation, the processing units used to perform the techniques at an entity (e.g., a terminal or a location server) may be implemented within one or more ASICs, digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. In general, any machine/computer/processor-readable medium tangibly embodying firmware and/or software instructions/code may be used in implementing the techniques described herein. For example, the firmware and/or software instructions/code may be stored in a memory (e.g., memory 822 or 852 in FIG. 8) and executed by a processor (e.g., processor 820 or 850). The memory may be implemented within the processor or external to the processor. The firmware and/or software instructions/code may also be stored in a machine/computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The instructions/code may be executable by one or more processors and may cause the processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for communication, comprising:
   at least one processor configured to:
   decide whether to perform a registration with a location server, wherein the decision is based on a determination that the location server cannot determine an Internet Protocol (IP) address of a terminal when IP connectivity associated with the apparatus is acquired via an access network other than a home network associated with the apparatus, and
   engage in communication with the location server to perform the registration if registration is selected, wherein the communication identifies the terminal to the location server, instigates mutual authentication of the terminal and the location server, and provides the IP address of the terminal to the location server, and wherein the location server sends, using the IP address, messages to the terminal for network-initiated location services;
   receive a repeat timer value from the location server; and
   a memory coupled to the at least one processor.

2. The apparatus of claim 1, wherein the at least one processor is configured to receive, from the location server, a message to start a network-initiated location session, and the message is received based on the IP address provided to the location server during the registration.

3. The apparatus of claim 1, wherein the at least one processor is further configured to decide to perform the registration in response to detecting that the location server does not belong to a home network of the terminal.

4. The apparatus of claim 1, wherein the at least one processor is further configured to decide to perform the registration in response to detecting a change in the IP address of the terminal.

5. The apparatus of claim 1, wherein the at least one processor is further configured to decide to perform the registration in response to detecting that a timer expires.

6. The apparatus of claim 1, wherein the at least one processor is further configured to receive a timer value from the location server, set a timer based on the timer value, and perform registration with the location server when the timer expires.

7. The apparatus of claim 1, wherein the at least one processor is further configured to establish a secure IP connection with the location server, send the IP address of the terminal via the secure IP connection to the location server, and maintain the secure IP connection for the registration or a location session with the location server.

8. The apparatus of claim 1, wherein the terminal is a Secure User Plane Location (SUPL) enabled terminal (SET) and the location server is a Home SUPL Location Platform (H-SLP).

9. The apparatus of claim 1, wherein the at least one processor is further configured to perform mutual authentication with the location server using at least one of Transport Layer Security (TLS), Pre-Shared Key and Transport Layer Security (PSK-TLS), or Generic Bootstrap Architecture (GBA).

10. A method for wireless communication, comprising:
    deciding, at an apparatus, whether to perform a registration with a location server, wherein the decision is based on a determination that the location server cannot determine an Internet Protocol (IP) address of a terminal when an IP connectivity associated with the apparatus is acquired via an access network other than a home network associated with the apparatus; and
    communicating with the location server to perform the registration if registration is selected, wherein the communicating identifies the terminal to the location server, instigates mutual authentication of the terminal and the location server, and provides the IP address of the terminal to the location server, and wherein the location server sends, using the IP address, messages to the terminal for network-initiated location services; and
    receiving a repeat timer value from the location server.

11. The method of claim 10, further comprising:
    receiving, from the location server, a message to start a network-initiated location session, wherein the message is received based on the IP address provided to the location server during the registration.

12. The method of claim 10, further comprising:
    receiving a timer value from the location server;
    setting a timer based on the timer value; and
    performing registration with the location server when the timer expires.

13. An apparatus for wireless communication, comprising:
    means for deciding whether to perform registration with a location server, wherein the decision is based on a determination that the location server cannot determine an Internet Protocol (IP) address of a terminal when an IP connectivity associated with the apparatus is acquired via an access network other than a home network associated with the apparatus; and means for communicating with the location server to perform the registration if registration is selected, wherein the means for communicating identifies the terminal to the location server, instigates mutual authentication of the terminal and the location server, and provides the IP address of the terminal to the location server, and wherein the location server sends, using the IP address, messages to the terminal for network-initiated location services; and means for receiving a repeat timer value from the location server.

14. The apparatus of claim 13, further comprising:
means for receiving, from the location server, a message to start a network-initiated location session, wherein the message is received based on the IP address provided to the location server during the registration.

15. The apparatus of claim 13, further comprising:
means for receiving a timer value from the location server;
means for setting a timer based on the timer value; and
means for performing registration with the location server when the timer expires.

16. A non-transitory computer-readable storage medium including computer-executable instructions configured to cause the computer to perform operations, the instructions comprising:
code configured to cause the computer to decide whether to perform registration with the location server, wherein the decision is based on a determination that the location server cannot determine an Internet Protocol (IP) address of a terminal when an IP connectivity associated with the computer containing the storage medium is acquired via an access network other than a home network associated with the computer, and
code configured to cause the computer to engage in communication with the location server to perform the registration if registration is selected, wherein the communication identifies the terminal to the location server, instigates mutual authentication of the terminal and the location server, and provides the IP address of the terminal to the location server, and wherein location server sends, using the IP address, messages to the terminal for network-initiated location services; and
code configured to cause the computer to receive a repeat timer value from the location server.

17. The non-transitory computer-readable storage medium of claim 16, further comprising:
code configured to cause the computer to receive, from the location server, a message to start a network-initiated location session, wherein the message is received based on the IP address provided to the location server during the registration.

18. The non-transitory computer-readable storage medium of claim 16, further comprising code configured to cause the computer to:
receive a timer value from the location server,
set a timer based on the timer value, and
initiate registration with the location server when the timer expires.

19. An apparatus for communication, comprising:
at least one processor configured to:
engage in communication with a terminal to register the terminal with a location server, wherein the engagement is based on a determination that the location server cannot determine an Internet Protocol (IP) address of the terminal when an IP connectivity associated with the terminal is acquired via an access network other than a home network associated with the terminal, and send a message to the terminal to start a network-initiated location session, wherein the message identifies the terminal to the location server, instigates mutual authentication of the terminal and the location server, and provides the IP address of the terminal to the location server, and wherein the message uses the IP address received from the terminal during the registration;
receive a repeat timer value from the location server; and
a memory coupled to the at least one processor.

20. The apparatus of claim 19, wherein the at least one processor is configured to send a timer value to the terminal, wherein the timer value is used by the terminal to perform the registration with the location server.

21. The apparatus of claim 19, wherein the at least one processor is configured to register the terminal by:
receiving at least one IP packet from the terminal,
obtaining a first IP address from a source address field of the at least one IP packet,
obtaining a second IP address from a payload of the at least one IP packet,
comparing the first and second IP addresses,
using the second IP address as a target IP address of the terminal if the first and second IP addresses match, and
using the first IP address as the target IP address of the terminal if the first and second IP addresses do not match.

22. The apparatus of claim 19, wherein the terminal is a Secure User Plane Location (SUPL) enabled terminal (SET) and the location server is a Home SUPL Location Platform (H-SLP).

23. A method for wireless communication, comprising:
communicating with a terminal to register the terminal with a location server, wherein the communicating is based on a determination that the location server cannot determine an Internet Protocol (IP) address of the terminal when an IP connectivity associated with the terminal is acquired via an access network other than a home network associated with the terminal, wherein communicating comprises:
receiving a communication identifying the terminal to the location server, instigating mutual authentication of the terminal and the location server, and providing the IP address of the terminal to the location server; and
sending, from the location server to the terminal, a message to start a network-initiated location session, wherein the message uses the IP address received from the terminal during the registration; and
receiving a repeat timer value from the location server.

24. The method of claim 23, further comprising:
sending, during the registration, a timer value to the terminal to enable the terminal to perform a subsequent registration with the location server.

25. The method of claim 23, further comprising:
receiving at least one IP packet from the terminal;
obtaining a first IP address from a source address field of the at least one IP packet;
obtaining a second IP address from a payload of the at least one IP packet;
comparing the first and second IP addresses;
using the second IP address as the IP address of the terminal if the first and second IP addresses match; and
using the first IP address as the IP address of the terminal if the first and second IP addresses do not match.

26. An apparatus for wireless communication, comprising:
means for communicating with a terminal to register the terminal with a location server, wherein the communicating is based on determination that the location server cannot determine an Internet Protocol (IP) address of the terminal when an IP connectivity associated with the terminal via an access network other than a home network associated with the terminal, wherein the means for communicating comprises:
    means for receiving a communication for identifying the terminal to the location server,
    means for instigating mutual authentication of the terminal and the location server, and
    means for providing the IP address of the terminal to the location server; and
means for sending, from the location server to the terminal, a message to start a network-initiated location session, wherein the message uses the IP address received from the terminal during the registration; and
means for receiving a repeat timer value from the location server.

27. The apparatus of claim 26, further comprising:
means for sending, during the registration, a timer value to the terminal to enable the terminal to perform a subsequent registration with the location server.

28. The apparatus of claim 26, further comprising:
means for receiving at least one IP packet from the terminal;
means for obtaining a first IP address from a source address field of the at least one IP packet;
means for obtaining a second IP address from a payload of the at least one IP packet;
means for comparing the first and second IP addresses;
means for using the second IP address as the IP address of the terminal if the first and second IP addresses match; and
means for using the first IP address as the IP address of the terminal if the first and second IP addresses do not match.

29. A non-transitory computer-readable storage medium including computer-executable instructions configured to cause the computer to perform operations, the instructions comprising:
    code configured to cause the computer to communicate with a terminal to register the terminal with a location server, wherein the communicating is based on a determination that the location server cannot determine an Internet Protocol (IP) address of the terminal when an IP connectivity associated with the terminal is acquired via an access network other than a home network associated with the terminal, wherein the code configured to cause the computer engage in communication comprises:
        code configured to cause the computer to receive a communication identifying the terminal to the location server,
        code configured to cause the computer to instigate mutual authentication of the terminal and the location server, and
        code configured to cause the computer to provide the IP address of the terminal to the location server; and
code configured to cause the computer to send a message to start a network-initiated location session, wherein the message uses the IP address received from the terminal during the registration; and
code configured to cause the computer to receive a repeat timer value from the location server.

30. The non-transitory computer-readable storage medium of claim 29, further comprising:
code configured to cause the computer to send, during the registration, a timer value to the terminal to enable the terminal to perform a subsequent registration with the location server.

31. The non-transitory computer-readable storage medium of claim 29, further comprising code configured to cause the computer to:
receive at least one IP packet from the terminal,
obtain a first IP address from a source address field of the at least one IP packet,
obtain a second IP address from a payload of the at least one IP packet,
compare the first and second IP addresses,
use the second IP address as the IP address of the terminal if the first and second IP addresses match, and
use the first IP address as the IP address of the terminal if the first and second IP addresses do not match.

32. The apparatus of claim 1, wherein the terminal is not aware of a public IP address of the terminal.

33. The apparatus of claim 1,
wherein the terminal is configured to send a public IP address of the terminal to the location server by including a private IP address within a source address field of a message to be sent to a router,
wherein the router is configured to replace the private IP address within the source field with the public IP address.

34. A method for wireless communication, comprising:
deciding whether to perform a registration with a location server, wherein the deciding is based on a determination that the location server cannot determine an Internet Protocol (IP) address of a terminal when one or more events are detected; and
communicating with the location server to perform the registration if registration is selected, wherein the communicating:
    identifies the terminal to the location server,
    instigates mutual authentication of the terminal and the location server, and
    provides public and private IP addresses of the terminal to the location server, wherein the location server uses at least one of the public and/or private IP addresses to send messages to the terminal for network-initiated location services; and
receives a repeat timer value from the location server.

35. The method of claim 34, wherein the terminal is configured to engage in a positioning session with the location server to determine a position of the terminal.

36. The method of claim 34, wherein the communicating includes:
while a secure IP connection is established between the terminal and the location server:
    sending a Secure User Plane Location (SUPL) registration message to the location server;
    receiving, at the terminal and from the location server, an acknowledge (ACK) message in response to the SUPL registration message.

37. A method for wireless communication, comprising:
communicating with a terminal to register the terminal with a location server, wherein the communicating is based on a determination that the location server cannot determine an Internet Protocol (IP) address of the terminal when one or more events are detected at the terminal, wherein communicating comprises:

receiving a communication identifying the terminal to the location server, instigating mutual authentication of the terminal and the location server, and providing public and private IP addresses of the terminal to the location server; and sending, from the location server to the terminal, a message to start a network-initiated location session, wherein the message uses at least one of the public and/or private IP addresses received from the terminal during the registration; and receiving a repeat timer value from the location server.

38. The method of claim 37, wherein the location server is configured to engage in a positioning session with the terminal to determine a position of the terminal.

39. The method of claim 37, wherein the communicating includes:

while a secure IP connection is established between the terminal and the location server:

receiving a Secure User Plane Location (SUPL) registration message from the terminal at the location server;

sending, from the location server to the terminal, an acknowledge (ACK) message in response to the SUPL registration message.

\* \* \* \* \*